M. A. VALY.
BEATER.
APPLICATION FILED APR. 1, 1908.
931,100.
Patented Aug. 17, 1909.
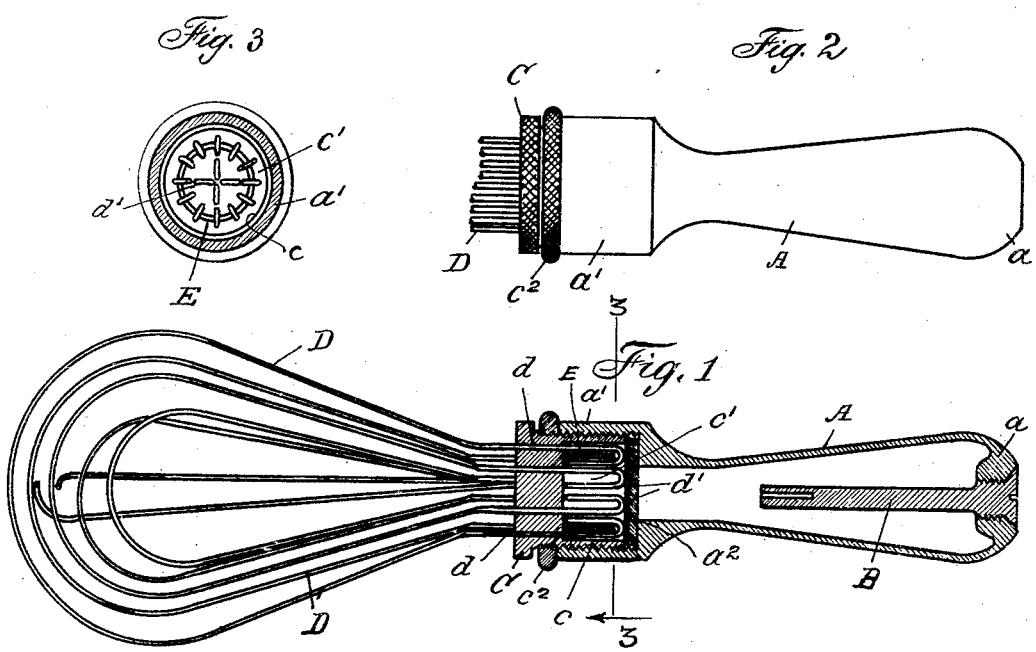
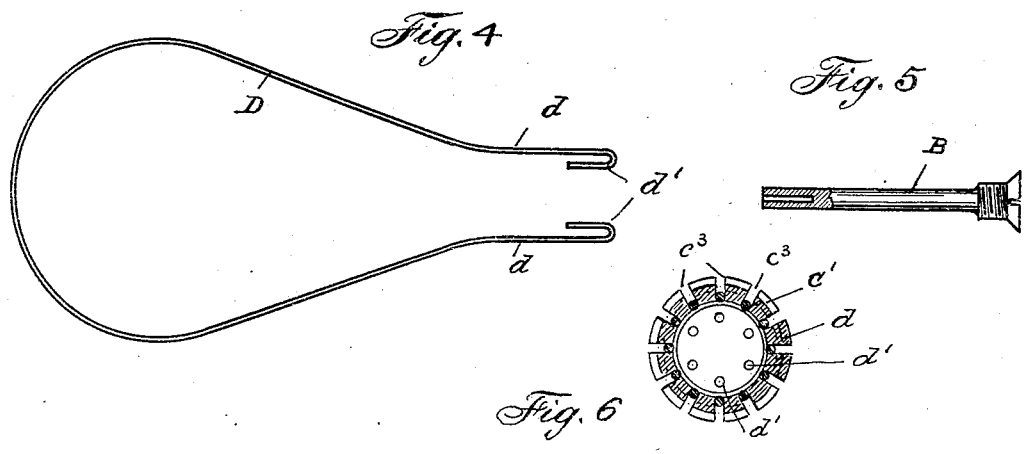
Witnesses
Charles Kozisek
Earl Barr
Inventor
Maximilian A. Valy
by Robt. Kloz
Atty.

UNITED STATES PATENT OFFICE.

MAXIMILIAN A. VALY, OF CHICAGO, ILLINOIS.

BEATER.

No. 931,100.  Specification of Letters Patent.  Patented Aug. 17, 1909.

Application filed April 1, 1908. Serial No. 424,634.

*To all whom it may concern:*

Be it known that I, MAXIMILIAN A. VALY, a citizen of the United States, and residing at Chicago, in the county of Cook and State of Illinois, have invented a new and useful Improvement in Beaters, of which the following is a complete specification.

This invention relates to improvements in beaters and more particularly to a beater of that class used for culinary purposes. Heretofore beaters of this class have not been so constructed that the beating members could be easily removed should they become injured, and as a consequence if they do become so injured as to render the device inoperative, or as to render its operation less effective, the whole device must be thrown away and replaced by a new one.

The object of this invention is to provide a beater for culinary purposes by means of which the operator may whip the material to be beaten, and in which the beating members may be removed for the purpose of repair or to be replaced by new members.

It is a further object of the invention to provide a beater so constructed that any one may readily form and attach the beating members in case they or any of them should become injured to such an extent as to render their replacement desirable.

The invention consists of the matters hereinafter described in the specification and more fully pointed out and defined in the appended claim.

In the drawings: Figure 1 is a longitudinal section of a device embodying my invention. Fig. 2 is a fragmentary, side elevation of the same. Fig. 3 is a section taken on line 3—3 of Fig. 1. Fig. 4 is a side elevation of one of the beating members. Fig. 5 is a fragmentary, side elevation of the forming tool for said members. Fig. 6 is a transverse section of a modified form of the device.

As shown in said drawings: A indicates a hollow handle of any desired material but preferably of a suitable metal, and which is provided with a threaded opening in the end $a$ for the reception of the forming tool B which will hereinafter be more fully described. The opposite or attaching end of said handle is enlarged and chambered to provide an internally threaded stuffing box $a'$, in the bottom of which is a packing $a^2$ of any desired material adapted to prevent water or other liquids from entering the handle. Having threaded engagement in said stuffing box $a'$ is the follower nut C, having a peripheral flange $c$ on its inner end which seats on said packing and provides a chamber $c'$ for the inner ends of the beaters D. If preferred a lock nut $c^2$ may be carried on the follower nut C and when the latter is at the inner limit of its movement in said box, the lock nut may be set up against the edge of the box to prevent the following nut from turning, as shown more clearly in Fig. 1. Said beating members may be of any preferred construction, but, as shown, they are each constructed of a wire bent in the form of a loop and having its ends $d$ approximately parallel with each other.

The follower nut C is provided with a plurality of apertures opening through its inner face into the chamber $c'$, and the ends $d$ of each member are inserted through two of said apertures and bent back upon themselves to provide hooks $d'$. A locking ring E is contained in the chamber $c'$ and a part of said hooks engage over the ring and the remainder thereof abut against the inner face of the follower nut and prevent the withdrawal of the members.

In assembling the device the ends $d$ of the members are inserted through the apertures in the nut C and by means of the tool B, which comprises a bar having a longitudinal socket in one end of a depth equal to the length of the hook desired, said ends are bent back as shown in Fig. 4. Said members are forced through the follower nut far enough to permit the ring E to be inserted in place, and then they are pulled back to place and the follower nut inserted in the stuffing box.

In the construction shown in Fig. 6 the locking ring is dispensed with and the follower nut C' is provided with a plurality of longitudinal grooves $c^3$ in its outer surface through which the ends $d$ are inserted and then turned inwardly over the inner end of the nut or flange.

When it is desired to remove one of the beating members the follower is removed and the ends of the member straightened to permit the removal of the member.

Obviously a beater constructed in accordance with my invention affords a very cheap and simple device capable of having its beating members removed and replaced without difficulty, and obviously many details of form and construction may be varied without departing from the principles of my invention.

I claim as my invention.

In a device of the class described the combination with a handle having a stuffing box thereon, of a follower nut engaged in said box, a plurality of looped members extending through said nut and having hooked ends on the inner side of said nut to prevent their removal, and means carried in said handle adapted to form said hooked ends.

In testimony whereof I have hereunto subscribed my name in the presence of two witnesses.

MAXIMILIAN A. VALY.

Witnesses:
 FRANK LOESER,
 CHARLES KOZISEK.